United States Patent
Lusher, II

(10) Patent No.: US 10,723,092 B2
(45) Date of Patent: Jul. 28, 2020

(54) METHOD AND APPARATUS FOR MANUFACTURING AN OPTICAL ARTICLE

(71) Applicant: PPG Industries Ohio, Inc., Cleveland, OH (US)

(72) Inventor: David Lewis Lusher, II, Cheswick, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 136 days.

(21) Appl. No.: 15/651,781

(22) Filed: Jul. 17, 2017

(65) Prior Publication Data

US 2018/0015679 A1    Jan. 18, 2018

Related U.S. Application Data

(60) Provisional application No. 62/363,690, filed on Jul. 18, 2016.

(51) Int. Cl.
*B29D 11/00* (2006.01)
*B29C 31/04* (2006.01)

(52) U.S. Cl.
CPC ...... *B29D 11/00538* (2013.01); *B29C 31/041* (2013.01); *B29D 11/00028* (2013.01); *B29D 11/00432* (2013.01)

(58) Field of Classification Search
CPC .................................................. B29C 31/041
See application file for complete search history.

(56) References Cited

U.S. PATENT DOCUMENTS

| | | | |
|---|---|---|---|
| 3,752,623 A | * | 8/1973 | Sinn ...................... B29B 7/7615 264/331.19 |
| 5,191,055 A | | 3/1993 | Kanemura et al. |
| 5,837,797 A | | 11/1998 | Okazaki et al. |

(Continued)

FOREIGN PATENT DOCUMENTS

WO    WO-2016204111 A1 * 12/2016  ............. B29C 39/24

OTHER PUBLICATIONS

Oneal Steel, "304/304 L Pipe", https://www.onealsteel.com/stainless-steel-pipe-304.html, available Mar. 18, 2015 per Wayback Machine, 2 pages. (Year: 2015).*

(Continued)

*Primary Examiner* — Lisa L Herring
(74) *Attorney, Agent, or Firm* — The Webb Law Firm

(57) ABSTRACT

A molding apparatus for molding an optical article has a reactor vessel having an interior cavity configured to receive a quantity of a flowable forming material, a mold assembly defining a mold cavity therein, a diaphragm valve disposed between the reactor vessel and the mold assembly, and a tubing connecting the diaphragm valve to the reactor vessel and the mold assembly. The diaphragm valve is operable between an open configuration to permit a flow of the flowable forming material through the tubing from the reactor vessel to the mold cavity and a closed configuration to block the flow of the flowable forming material from the reactor vessel to the mold cavity. A filter is disposed between the reactor vessel and the diaphragm valve. The tubing has an upstream tubing section between the reactor vessel and the filter and a downstream tubing section between the filter and the diaphragm valve.

10 Claims, 1 Drawing Sheet

(56) References Cited

U.S. PATENT DOCUMENTS

| | | | |
|---|---|---|---|
| 5,921,587 A * | 7/1999 | Lueghamer | B29C 65/342 |
| | | | 285/21.2 |
| 6,228,204 B1 * | 5/2001 | Reinhardt | B29C 66/1142 |
| | | | 156/304.2 |
| 7,687,597 B2 | 3/2010 | Bojkova | |
| 2012/0286435 A1 | 11/2012 | Bojkova et al. | |
| 2017/0052284 A1 | 2/2017 | Badarinarayana et al. | |
| 2018/0169899 A1 * | 6/2018 | Renkl | B29B 7/7615 |
| 2019/0091953 A1 * | 3/2019 | Ito | B29C 39/24 |

OTHER PUBLICATIONS

Saint-Gobain, "Norprene® Chemical tubing", https://www.usplastic.com/catalog/files/specsheets/FT-Norprene-Chemical.pdf,, Saint-Gobain Performance Plastics, available per Wayback Machine Aug. 2015, 2 pages. (Year: 2015).*

* cited by examiner

US 10,723,092 B2

METHOD AND APPARATUS FOR MANUFACTURING AN OPTICAL ARTICLE

CROSS-REFERENCE TO RELATED APPLICATION

This application claims priority to U.S. Provisional Application No. 62/363,690, entitled "Method and Apparatus for Manufacturing an Optical Article", filed on Jul. 18, 2016, the disclosure of which is incorporated herein by reference in its entirety.

BACKGROUND OF THE INVENTION

Field of the Invention

The present invention generally relates to a method and/or apparatus for manufacturing an optical article, such as an optical lens, by delivering a flowable forming material to a mold of a molding apparatus. The present invention further relates to an optical article manufactured by the method and/or apparatus of the invention.

Technical Considerations

Various manufacturing methods exist for making optical articles, such as optical or ophthalmic lenses. Some manufacturing methods are based on a molding process which allows for the manufacture of lenses in large quantities. In such a molding process, a flowable forming material is delivered to one or more mold cavities that are shaped in the final desired shape of the lens. Typically, lenses are produced by a pair of mold halves that together define the mold cavity. The flowable forming material is delivered to the mold cavity and is then cured to form the lens. The mold halves are separated and the formed lens is extracted from the mold cavity. The formed lens may then be subjected to various post-molding steps, including inspection, cleaning, and the application of one or more coatings on a surface of the lens, such as a primer coating, a hard coating, a photochromic coating, and/or an antireflection coating.

Existing molding processes can have deficiencies that contribute to the formation of one or more defects in the lens. For example, it has been found that the structure of the apparatus used to transport the flowable forming material to the mold can greatly affect the quality of the molded lens. For example, the structure of the apparatus can lead to the formation of striations in the lens and/or can promote the presence of impurities in the molded lens. Therefore, there exists a need for an improved method and/or apparatus of manufacturing lenses by using a molding process that reduces or eliminates the formation of defects, such as striations or impurities, to overcome the inherent limitations of the materials and processes currently known.

Accordingly, it would be desirable to develop new methods of manufacturing optical articles, such as optical or ophthalmic lenses, using a molding process that reduces or eliminates the formation of lens defects. It further would be desirable to develop new lens manufacturing methods that minimize or eliminate the formation of defects caused during the delivery of the flowable forming material to the mold cavity. For example, it would be desirable to develop new lens manufacturing methods that minimize or eliminate the formation of striations in the molded lens.

SUMMARY OF THE INVENTION

It has been found that improvements in the manner in which the flowable forming material is delivered to the mold cavity can result in a notable decrease in, and/or elimination of, certain defects in the lens. In particular, the improvements in delivery of the flowable material contribute to a reduction or elimination of striations in the molded lens. Striations are caused by slight differences in the refractive index of the lens forming material. In a finished lens, striations are undesirable because they appear as a distortion when attempting to look through the lens. The improvements can also promote the reduction of physical defects, such as debris, in the lens.

In some examples, a molding apparatus for molding an optical article may have a reactor vessel having an interior cavity configured to receive a quantity of a flowable forming material, a mold assembly defining a mold cavity therein, a diaphragm valve disposed between the reactor vessel and the mold assembly, and a tubing connecting the diaphragm valve to the reactor vessel and the mold assembly. The diaphragm valve may be operable between an open configuration to permit a flow of the flowable forming material through the tubing from the reactor vessel to the mold cavity and a closed configuration to block the flow of the flowable forming material through the tubing from the reactor vessel to the mold cavity.

In some examples, a filter may be disposed between the reactor vessel and the diaphragm valve. The tubing may have an upstream tubing section between the reactor vessel and the filter, and a downstream tubing section between the filter and the diaphragm valve. The upstream tubing section may have material selected from perfluoroalkoxy (PFA) tubing, polytetrafluoroethylene (PTFE) tubing, stainless steel tubing, polypropylene tubing, or any combination thereof. The downstream tubing section may have material selected from the group consisting of perfluoroalkoxy (PFA) tubing, polytetrafluoroethylene (PTFE) tubing, stainless steel tubing, polypropylene tubing, tubing having MASTERFLEX CHEM-DURANCE Bio tubing, STA-PURE tubing, and any combination thereof. The upstream tubing section may have perfluoroalkoxy (PFA) tubing and the downstream tubing section may have polypropylene tubing. The upstream tubing section may have perfluoroalkoxy (PFA) tubing and the downstream tubing section may have MASTERFLEX CHEM-DURANCE Bio tubing. The downstream tubing may have a second tubing section, a third tubing section, and a fourth tubing section. The second tubing section may have 304 stainless steel piping. The third tubing section may have polypropylene tubing, polytetrafluoroethylene (PTFE) tubing, or MASTERFLEX CHEM-DURANCE Bio tubing. The fourth tubing section may have polypropylene tubing, chlorinated polyvinyl chloride (CPVC) tubing, 304 stainless steel piping, 316 stainless steel piping, or any combination thereof. The diaphragm valve may be connected to the mold assembly by a fifth tubing section. The fifth tubing section may have 304 stainless steel piping. A static mixer may be disposed between the diaphragm valve and the mold assembly. A sixth tubing section may connect the static mixer to the mold assembly. The mold assembly may have a pair of separable mold halves.

In some examples, a molding apparatus for molding an optical article may have a reactor vessel having an interior cavity configured to receive a quantity of a flowable forming material; a mold assembly defining a mold cavity therein; a diaphragm valve disposed between the reactor vessel and the mold assembly; a filter disposed between the reactor vessel and the diaphragm valve; and a tubing connecting the reactor vessel to the mold assembly. The diaphragm valve may be operable between an open configuration to permit a flow of the flowable forming material through the tubing from the reactor vessel to the mold cavity and a closed configuration to block the flow of the flowable forming material through the tubing from the reactor vessel to the mold cavity. The tubing may have an upstream tubing section between the reactor vessel and the filter, and a downstream tubing section between the filter and the diaphragm valve. The upstream tubing section may have perfluoroalkoxy (PFA) tubing, and the downstream tubing section may have polypropylene tubing or MASTERFLEX CHEM-DURANCE Bio tubing.

In some examples, a method of manufacturing an optical article may include supplying a flowable forming material from a reactor vessel to a diaphragm valve through one or more tubing sections; operating the diaphragm valve between an open configuration to permit a flow of the flowable forming material through the one or more tubing sections from the reactor vessel to a mold cavity and a closed configuration to block the flow of the flowable forming material from the reactor vessel to the mold cavity; filling the mold cavity with the flowable forming material through the diaphragm valve when the diaphragm valve is in the open configuration; polymerizing the flowable forming material within the mold cavity to form the optical article; and removing the optical article from the mold cavity. The method may further include supplying the flowable forming material to a filter prior to supplying the flowable forming material to the diaphragm valve. The method may further include supplying the flowable forming material to a mixer prior to filling the mold cavity.

These and other features and characteristics of an apparatus for making optical articles and methods of making the same will become more apparent upon consideration of the following description and the appended claims with reference to the accompanying drawings, all of which form a part of this specification, wherein like reference numerals designate corresponding parts in the various drawings. It is to be expressly understood, however, that the drawings are for the purpose of illustration and description only.

DETAILED DESCRIPTION OF THE INVENTION

Figure 1:
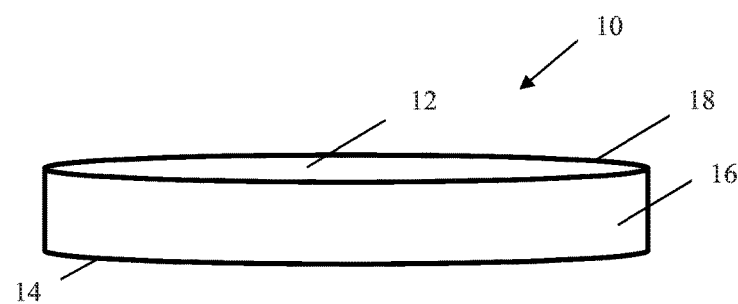
FIG. 1 is a perspective view of an optical article made in accordance with the method of the present invention.

Spatial or directional terms, such as "left", "right", "inner", "outer", "above", "below", and the like, are not to be considered as limiting as the invention can assume various alternative orientations.

All numbers used in the specification and claims are to be understood as being modified in all instances by the term "about". By "about" is meant a range of plus or minus ten percent of the stated value.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used in the specification and the claims, the singular form of "a", "an", and "the" include plural referents unless the context clearly dictates otherwise.

The terms "first", "second", and the like are not intended to refer to any particular order or chronology, but instead refer to different conditions, properties, or elements.

All documents referred to herein are "incorporated by reference" in their entirety.

By "at least" is meant "greater than or equal to". By "not greater than" is meant "less than or equal to".

The term "includes" is synonymous with "comprises".

The term "optical" means pertaining to or associated with light and/or vision. For example, according to various non-limiting examples disclosed herein, the optical element, article or device can be chosen from ophthalmic elements, articles, and devices, display elements, articles, and devices, visors, windows, and mirrors.

The term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

The term "polymer" means homopolymers (e.g., prepared from a single monomer species), copolymers (e.g., prepared from at least two monomer species), and graft polymers.

The term "flowable forming material" means a material suitable for use in forming an optical or ophthalmic article and having a viscosity of less than 2000 cps, preferably less than 1000 cps, more preferably less than 600 cps at a temperature of the material during a filling step of a mold. The temperature during the filling step may range from 0-60° C., typically between 15-30° C. The viscosity is measured by a Brookfield CAP2000+ Cone & Plate viscometer, available from Brookfield Engineering Labs, using a CAP-S-01 spindle at 500-1000 rpm. In some non-limiting examples disclosed herein, the flowable forming material may be a reactive mixture comprising a polyisocyanate and/or a polyisothiocyanate, and a component comprising two or more active hydrogen groups selected from hydroxyl and thiol.

The terms "striations" and "flow lines" refer to visible streak defects arising from local inhomogeneities in refractive index throughout the optical article.

The term "inclusions" refers to visible debris in the article arising from foreign matter or gelled particles of the flowable forming material.

The term "curable" means a material capable of polymerizing or crosslinking. By "cured" is meant that the material is at least partly polymerized or crosslinked, preferably fully polymerized or crosslinked.

By "free of" is meant that the component being discussed is not intentionally present. For example, a composition described as "free of component X" or "X-free" means that component X is not intentionally added to the composition. However, there may be trace amounts of component X present in the composition due to manufacturing limitations.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of, the following aspects of the invention, in any combination. Various examples of the invention may be discussed separately. However, it is to be understood that this is simply for ease of illustration and discussion. In the practice of the invention, one or more aspects of the invention described in one example can be combined with one or more aspects of the invention described in one or more of the other examples.

Optical Article

FIG. 1 illustrates an optical article 10 made by a molding process using a molding apparatus 100 of the invention (discussed below with reference to FIGS. 2-6). The optical article 10 can be selected from optical or ophthalmic articles or elements, display articles or elements, visors, windows, mirrors, active liquid crystal cell articles or elements, and passive liquid crystal cell articles or elements.

With reference to FIG. 1, the optical article 10 has a forward or top surface 12, a rearward or bottom surface 14, and a side surface 16 extending between the top surface 12 and the bottom surface 14. When the optical article 10 is an ophthalmic lens, the bottom surface 14 is opposed to the eye of an individual wearing optical article 10, the side surface 16 typically resides within a supportive frame, and the top surface 12 faces incident light (not shown), at least a portion of which passes through optical article 10 and into the individual's eye. At least one of the top surface 12, the bottom surface 14, and the side surface 16 may be convex, concave, or planar, or a combination of one or more of convex, concave, and planar surfaces. The optical article 10 defines an optical substrate upon which one or more coatings can be applied.

The optical article 10 has an exterior surface 18 that generally defines an overall outer physical shape of the optical article 10. The exterior surface 18 of the optical article 10 is defined by the top surface 12, the bottom surface 14, and/or the side surface 16. At least a portion of the exterior surface 18 of the optical article 10 may have a concave surface, a convex surface, or a planar surface, or a combination of one or more of convex, concave, and planar surfaces.

Examples of optical articles 10 that are ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

The optical article 10 may be made from a polymeric material. The polymeric material is desirably flowable such that it can flow from a reactor vessel to a mold before polymerizing, e.g., curing, in the mold.

The optical article 10 is desirably made from a transparent material or a translucent material.

Flowable Forming Material

Non-limiting examples of the sulfur containing urethane based polymeric material that can be used to form the optical article 10 comprises reaction products between compounds containing an active hydrogen atom, e.g. hydroxyl compounds, mercapto compounds and hydroxylated mercapto compounds with at least one isocyanate selected from the group consisting of polyisocyanate compounds, polyisothiocyanate compounds and isocyanategroup containing polyisothiocyanate compounds.

Non-limiting examples of compounds containing an active hydrogen atom used to prepare the sulfur containing urethane based polymeric material for optical article 10 are described in U.S. Pat. No. 7,687,597 B2, column 5, line 1 to column 15, line 63; U.S. Patent Application Publication No. 2012/0286435A1, paragraphs [0047] to [0124]; U.S. Pat. No. 5,191,055, column 2, line 33 to line 50; and U.S. Pat. No. 5,837,797, column 13, line 15 to column 16, line 40.

Non-limiting examples of polyisocyanate used to prepare the sulfur containing urethane based polymeric material for optical article 10 are described in U.S. Patent Application Publication No. 2012/0286435A1, paragraphs [0138] to [0140]; and U.S. Patent Application Publication No. 2017/0052284A1, paragraphs [56] to [61].

Molding Apparatus

Figure 2:
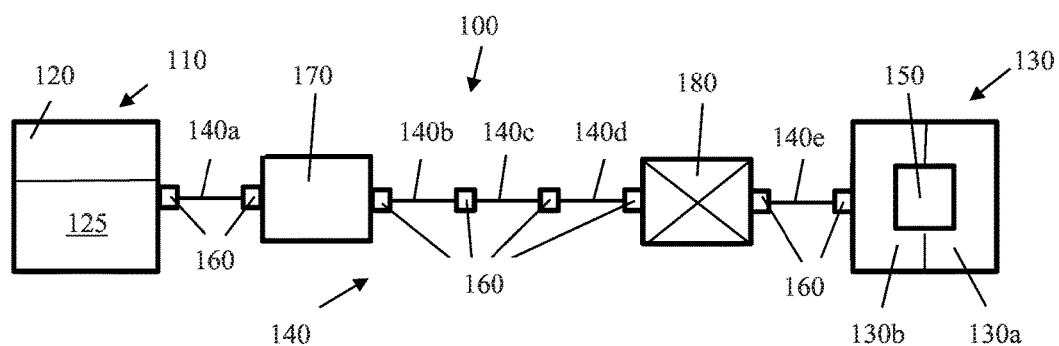
FIG. 2 is a schematic view of a molding apparatus of the present invention in accordance with one example.
Figure 3:
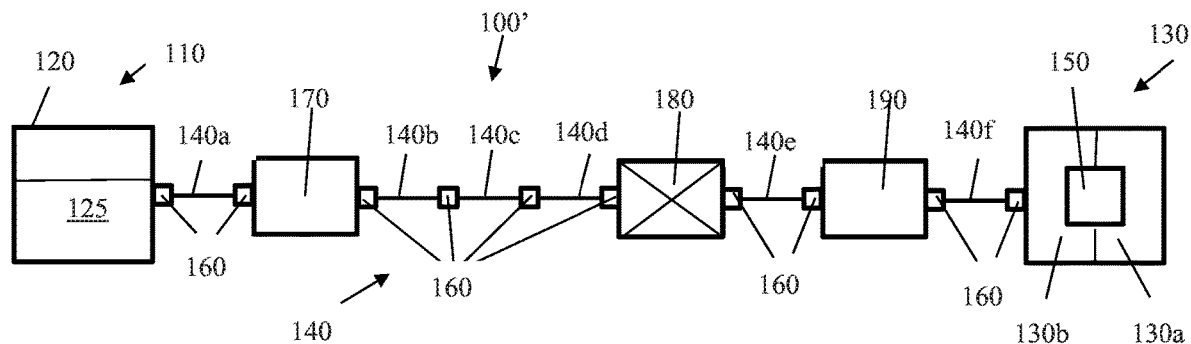
FIG. 3 is a schematic view of a molding apparatus of the present invention in accordance with another example.

The present invention is directed to a method and apparatus for manufacturing the optical article 10 using a molding process that reduces or eliminates the formation of striations and inclusions in the optical article 10. FIGS. 2-3 illustrate schematic diagrams of the general structure of a molding apparatus 100 of the invention in accordance with various examples.

With reference to FIG. 2, the molding apparatus 100 includes a reactor vessel 110 having an interior cavity 120 for containing a quantity of a flowable forming material 125 used to form the optical article 10. An example of a suitable reactor vessel 110 is a commercially available ten liter, stainless steel reactor vessel 110. Another example of a suitable reactor vessel 110 is a one gallon reactor vessel 110 commercially available from Max Process Equipment of Healdsburg, Calif.

The reactor vessel 110 is connected to a mold assembly 130 by one or more tubing elements 140 configured for delivering the flowable forming material 125 from the reactor vessel 110 to the mold assembly 130. The tubing elements 140 can comprise one or more tubing sections of the same or different material. In some examples, the molding apparatus 100 may have one or more additional elements between the reactor vessel 110 and the mold assembly 130, as discussed herein, with one or more tubing elements 140 connecting the various elements together to form a continuous flow path for the flowable forming material between the reactor vessel 110 and the mold assembly 130.

The mold assembly 130 may be separable to allow for removal of a molded optical article. In some examples, the mold assembly 130 has a first mold half 130a and a second mold half 130b. The first and second mold halves 130a, 130b define a mold cavity 150 for receiving the flowable forming material 125. The first and second mold halves 130a, 130b may be separable from one another to allow a molded optical article 10 to be removed from the mold cavity 150. The molding apparatus 100 may have a plurality of mold cavities 150 connected to the reactor vessel 110 to receive the flowable forming material 125 through one or more tubing elements 140.

With continued reference to FIG. 2, the flowable forming material 125 may be delivered to the mold cavity 150 by a pump mechanism (not shown), or by application of pressurized fluid, such as pressurized nitrogen gas, to the flowable forming material 125 within the interior cavity 120 of the reactor vessel 110. The flowable forming material 125 is displaced from the interior cavity 120 of the reactor vessel 110 and is delivered to the mold cavity 150 through the one or more tubing elements 140.

Examples of suitable tubing elements 140 include stainless steel piping (such as 304, 306, and/or 316 stainless steel piping with a rigid sidewall), lined stainless steel hose (such as a braided stainless steel hose with a polytetrafluoroethylene (PTFE) lining), tubing having a thermoplastic-elastomer outer layer with a plasticizer-free inner layer, such as MASTERFLEX L/S CHEM-DURANCE Bio tubing commercially available from Cole Parmer of Vernon Hills, Ill. (e.g., Model Number EW-06442-17), PTFE-reinforced silicone tubing, such as STA-PURE tubing commercially available from Cole Parmer of Vernon Hills, Ill. (e.g., Model Number FF-96212-24), perfluoroalkoxy (PFA) tubing, PTFE tubing, polypropylene tubing, chlorinated polyvinyl chloride (CPVC) tubing, and combinations thereof.

The one or more tubing elements 140 may be connected to each other and/or various components of the molding assembly 100 using one or more fittings 160. In some examples, the one or more fittings 160 may be threaded fittings.

With continued reference to FIG. 2, a filter 170 may be provided downstream of the reactor vessel 110 such that the flowable forming material 125 passes through the filter 170 before being delivered to the mold cavity 150. The filter 170 may be connected to the reactor vessel 110 by an upstream or first tubing section 140a. The first tubing section 140a comprises a flexible material selected from PFA tubing, PTFE tubing, or polypropylene tubing. The filter 170 may be a polypropylene filter. Exemplary filters include a Pall Kleenpak KA3J060P1 6.0 µm absolute filter, a GE Polycap HD 75 5.0 µm absolute filter with female National Pipe Thread (FNPT) inlet and outlet (2712T), and a GE Polycap HD 75 5.0 µm absolute filter with male NPT (MNPT) inlet and outlet (2712M).

With continued reference to FIG. 2, a valve 180 is provided between the reactor vessel 110 and the mold assembly 130 to control an amount of the flowable forming material 125 that is delivered to the mold cavity 150. The valve 180 is operable to selectively restrict or close the flow of the flowable forming material 125 from the reactor vessel 110 to the mold cavity 150. The valve 180 may be made from metal (such as 304, 306, and/or 316 stainless steel), PTFE, glass-filled PTFE, and combinations thereof. Operation of the valve 180 controls the flow of the flowable forming material 125 through the one or more tubing elements 140 downstream of the valve 180. In this manner, the valve 180 controls the supply of the flowable forming material 125 into the mold cavity 150. The valve 180 may be operated between an open configuration, wherein the flowable forming material 125 may flow through the valve 180, and a closed configuration, wherein the flow of the flowable forming material 125 is stopped, to selectively deliver a desired amount of the flowable forming material 125 to the mold cavity 150. In some examples, the valve 180 may be partially open, such as by positioning the valve 180 in a state between the open configuration and the closed configuration, wherein a flow rate of the flowable forming material 125 through the valve 180 is less than a maximum flow rate at the open configuration of the valve 180. In this manner, the flow rate of the flowable forming material 125 through the valve 180 can be controlled between a maximum flow rate, such as when the valve 180 is in the open configuration, and no flow rate, such as when the valve 180 is in the closed configuration. The valve 180 may be pneumatically actuated, such as by a foot pedal, to selectively open or close the valve 180, thereby controlling the supply of the flowable forming material to the mold cavity 150.

Examples of valves 180 include a diaphragm valve, a ball valve, a pinch valve, or any other valve configured for selectively restricting or closing the flow of the flowable forming material 125. A plurality of valves may be provided in parallel or series configuration. An exemplary diaphragm valve 180 is made by Swagelok (Model Number 6LVV-DPXBW6-P-C) with 316 stainless steel, Cobalt-based superalloy (UNS R30003)/AMS 5876, and PFA wetted parts. An exemplary ball valve 180 is made by Apollo (Model Number 76-101-27A) with CF8M, 316, PTFE, and glass-filled PTFE wetted parts. Exemplary pinch valves include B4M C/O pinch valve commercially available from Hach Company of Loveland, Colo.; Cleveland Model 104547 pinch valve commercially available from Heritage Parts; SCH284B008.12/DC commercially available from ASCO, and Aquasyn toggle pinch valve commercially available from Romynox.

With continued reference to FIG. 2, the valve 180 may be connected to the mold assembly 130 by one or more downstream tubing sections, such as the second tubing section 140b, third tubing section 140c, and/or fourth tubing section 140d. The tubing sections 140b-140d may be connected to one another by one or more fittings 160. In some examples, the second tubing section 140b comprises 304 stainless steel piping, the third tubing section 140c comprises polypropylene, PTFE, or MASTERFLEX CHEM-DURANCE Bio tubing, and the fourth tubing section 140d comprises polypropylene, CPVC, 304 stainless steel, or 316 stainless steel piping. The valve 180 is connected to the mold assembly 130 by a fifth tubing section 140e comprising 304 stainless steel and/or polypropylene piping. In some examples, the valve 180 is directly connected to the mold assembly 130.

With reference to FIG. 3, a molding apparatus 100' is shown in accordance with another aspect of the present disclosure. The components of the molding apparatus 100' shown in FIG. 3 are substantially similar or identical to the components of the molding apparatus 100 described herein with reference to FIG. 2. Reference numerals in FIG. 3 are used to illustrate identical components of the corresponding reference numerals in FIG. 2. As the previous discussion regarding the molding apparatus 100 generally shown in FIG. 2 is applicable to the molding apparatus 100' shown in FIG. 3, only the relative differences between the molding apparatus 100 generally shown in FIG. 2 and the molding apparatus 100' generally shown in FIG. 3 are discussed hereinafter.

With reference to FIG. 3, a mixer 190, such as an in-line static mixer, may be provided downstream of the filter 170 for mixing the flowable forming material 125 as it passes through the tubing elements 140 and before being delivered to the mold cavity 150. An exemplary mixer 190 is manufactured by Koflo Corporation of Cary, Ill. (Model No. 3/8-32) having 3/8" 316L stainless steel STRATOS tube mixer, 32 fixed helical-style mixing elements, and 17" overall length. The mixer 190 is connected to the mold assembly 130 by a sixth tubing section 140f comprising 304 stainless steel, 316 stainless steel, CPVC, and/or polypropylene piping. In some examples, the valve 180 is directly connected to the mold assembly 130.

Molding Process

In one exemplary and non-limiting method, the flowable forming material 125 comprised a pre-polymerized mixture of components A, B, and C, and organotin catalyst, where:

Component A is Methylene-bis(4-Cyclohexylisocyanate);
Component B is a proprietary mixture of dithiols; and.
Component C is a phosphate ester mold release with a tertiary amine catalyst.

The optical article 10 was prepared by adding Component A to the reactor vessel 110, followed by adding the organotin catalyst and Component C. The reactor vessel contents were then mixed at 140 rpm and heat was applied under vacuum conditions at approximately 45° C. for 20 minutes. Next, Component B was added to the reactor vessel 110. The reactor vessel contents were mixed again at 140 rpm and heated under vacuum to approximately 60° C. After 45 minutes following the addition of Component B, viscosity of the reactor vessel contents was measured every 15 minutes until the viscosity (measured @ 22° C.) reached approximately 175 cP. The reaction mixture was then cooled to 22° C. to 25° C. The mixing speed was then reduced to 40 rpm and the reactor vessel 110 was placed under 15 psi of nitrogen head pressure. The flowable forming material 125 was then transferred from the reactor vessel 110 to the mold assembly 130 to fill the mold cavity 150 through the tubing and valve arrangements described in Table 1 below. Examples 1 and 2 utilized diaphragm valves, while comparative examples 3-5 utilized ball or pinch valves. The filled mold assembly 130 was then placed into an oven for a 19.5 hour cycle with a maximum temperature of 130° C., where the flowable forming material 125 polymerized and hardened into the optical article 10. Following the polymerization cycle, the formed optical articles 10 were removed from the mold assemblies 130. The formed optical articles 10 were visually assessed for striation and inclusion defects as described below.

TABLE 1

| Example | Valve 180 | Tubing 140a | Tubing 140b, c, d, e | Lenses Cast | Pass Rate Striations | Pass Rate Inclusions |
|---|---|---|---|---|---|---|
| 1 | Diaphragm | PFA | Chem-durance[1] | 28 | ++ | ++ |
| 2 | Diaphragm | PFA | Polypropylene[1] | 37 | ++ | ++ |
| CE-3 | Ball | Stainless steel hose with PTFE lining | Stainless steel hose with PTFE lining[1] | 44 | ++ | 0 |
| CE-4 | Pinch | PFA | Sta-Pure | 68 | + | ++ |
| CE-5 | Pinch | PFA | Chem-Durance | 44 | 0 | ++ |

[1]Where indicated, flowable forming material exited valve directly into mold, no 340e segment was used.

In Table 1, the following pass rate scale was used for each type of defect, based on the total number of lenses cast:

>90% Pass++

70-90% Pass+

<70% Pass 0

The formed optical articles 10 were inspected for defects including striations (flow lines) and inclusions as follows:

Striations were detected by visual inspection of each optical article 10 using a Bulbtronics lens inspection unit Model No. BTX75LIS II, available from Bulbtronics. Optical articles 10 with no visible striations, or those with striations limited to within 7 mm of the edge of the optical article 10 were considered to "Pass." The presence of at least one striation within the remainder of the lens were considered to "Fail" the test.

Inclusions were evaluated by visual inspection of each lens. The appearance of any visible foreign material embedded within the lens resulted in a "Fail" rating.

Based on experimental data, optical articles 10 formed using a molding apparatus 100 having a diaphragm valve had the highest pass rate with minimum or no striations and inclusions.

The present invention may be characterized by one or more of the following clauses:

Clause 1. A molding apparatus for molding an optical article, the molding apparatus comprising:

a reactor vessel having an interior cavity configured to receive a quantity of a flowable forming material;

a mold assembly defining a mold cavity therein;

a diaphragm valve disposed between the reactor vessel and the mold assembly; and a tubing connecting the diaphragm valve to the reactor vessel and the mold assembly, wherein the diaphragm valve is operable between an open configuration to permit a flow of the flowable forming material through the tubing from the reactor vessel to the mold cavity and a closed configuration to block the flow of the flowable forming material through the tubing from the reactor vessel to the mold cavity.

Clause 2. The molding apparatus of clause 1, further comprising a filter disposed between the reactor vessel and the diaphragm valve.

Clause 3. The molding apparatus of clause 2, wherein the tubing comprises an upstream tubing section between the reactor vessel and the filter, and a downstream tubing section between the filter and the diaphragm valve.

Clause 4. The molding apparatus of clause 3, wherein the upstream tubing section comprises material selected from perfluoroalkoxy (PFA) tubing, polytetrafluoroethylene (PTFE) tubing, stainless steel tubing, polypropylene tubing, or any combination thereof.

Clause 5. The molding apparatus of clause 3 or clause 4, wherein the downstream tubing section comprises material selected from the group consisting of perfluoroalkoxy (PFA) tubing, polytetrafluoroethylene (PTFE) tubing, stainless steel tubing, polypropylene tubing, tubing having a thermoplastic-elastomer outer layer with a plasticizer-free inner layer, STA-PURE tubing, and any combination thereof.

Clause 6. The molding apparatus of any of clauses 3-5, wherein the upstream tubing section comprises perfluoroalkoxy (PFA) tubing and wherein the downstream tubing section comprises polypropylene tubing.

Clause 7. The molding apparatus of any of clauses 3-6, wherein the upstream tubing section comprises perfluoroalkoxy (PFA) tubing and wherein the downstream tubing section comprises tubing having a thermoplastic-elastomer outer layer with a plasticizer-free inner layer.

Clause 8. The molding apparatus of any of clauses 3-7, wherein the downstream tubing comprises a second tubing section, a third tubing section, and a fourth tubing section.

Clause 9. The molding apparatus of clause, wherein the second tubing section comprises 304 stainless steel piping.

Clause 10. The molding apparatus of clause 8 or clause 9, wherein the third tubing section comprises polypropylene tubing, polytetrafluoroethylene (PTFE) tubing, or tubing having a thermoplastic-elastomer outer layer with a plasticizer-free inner layer.

Clause 11. The molding apparatus of any of clauses 8-10, wherein the fourth tubing section comprises polypropylene tubing, chlorinated polyvinyl chloride (CPVC) tubing, 304 stainless steel piping, 316 stainless steel piping, or any combination thereof.

Clause 12. The molding apparatus of any of clauses 8-11, wherein the diaphragm valve is connected to the mold assembly by a fifth tubing section.

Clause 13. The molding apparatus of clause 12, wherein the fifth tubing section comprises 304 stainless steel piping.

Clause 14. The molding apparatus of any of clauses 2-13, further comprising a static mixer disposed between the diaphragm valve and the mold assembly.

Clause 15. The molding apparatus of clause 14, further comprising a sixth tubing section connecting the static mixer to the mold assembly.

Clause 16. The molding apparatus of any of clauses 1-15, wherein the mold assembly comprises a pair of separable mold halves.

Clause 17. A molding apparatus for molding an optical article, the molding apparatus comprising:
a reactor vessel having an interior cavity configured to receive a quantity of a flowable forming material;
a mold assembly defining a mold cavity therein;
a diaphragm valve disposed between the reactor vessel and the mold assembly;
a filter disposed between the reactor vessel and the diaphragm valve; and
a tubing connecting the reactor vessel to the mold assembly,
wherein the diaphragm valve is operable between an open configuration to permit a flow of the flowable forming material through the tubing from the reactor vessel to the mold cavity and a closed configuration to block the flow of the flowable forming material through the tubing from the reactor vessel to the mold cavity,
wherein the tubing comprises an upstream tubing section between the reactor vessel and the filter, and a downstream tubing section between the filter and the diaphragm valve,
wherein the upstream tubing section comprises perfluoroalkoxy (PFA) tubing, and
wherein the downstream tubing section comprises polypropylene tubing or tubing having a thermoplastic-elastomer outer layer with a plasticizer-free inner layer.

Clause 18. A method of manufacturing an optical article, the method comprising:
supplying a flowable forming material from a reactor vessel to a diaphragm valve through one or more tubing sections;
operating the diaphragm valve between an open configuration to permit a flow of the flowable forming material through the one or more tubing sections from the reactor vessel to a mold cavity and a closed configuration to block the flow of the flowable forming material from the reactor vessel to the mold cavity;
filling the mold cavity with the flowable forming material through the diaphragm valve when the diaphragm valve is in the open configuration;
polymerizing the flowable forming material within the mold cavity to form the optical article; and
removing the optical article from the mold cavity.

Clause 19. The method of clause 18, further comprising supplying the flowable forming material to a filter prior to supplying the flowable forming material to the diaphragm valve.

Clause 20. The method of clause 18 or clause 19, further comprising supplying the flowable forming material to a mixer prior to filling the mold cavity.

The present invention has been described with reference to specific details of particular examples thereof. It is not intended that such details be regarded as limitations upon the scope of the invention except insofar as and to the extent that they are included in the accompanying claims.

What is claimed is:

1. A molding apparatus for molding an optical article, the molding apparatus comprising:
a reactor vessel having an interior cavity configured to receive a quantity of a flowable forming material;
a mold assembly defining a mold cavity therein;
a diaphragm valve disposed between the reactor vessel and the mold assembly;
a filter disposed between the reactor vessel and the diaphragm valve; and
a tubing connecting the diaphragm valve to the reactor vessel and the mold assembly,
wherein the diaphragm valve is operable between an open configuration to permit a flow of the flowable forming material through the tubing from the reactor vessel to the mold cavity and a closed configuration to block the flow of the flowable forming material through the tubing from the reactor vessel to the mold cavity,
wherein the tubing comprises an upstream tubing section between the reactor vessel and the filter, and a downstream tubing section between the filter and the diaphragm valve,
wherein the upstream tubing section comprises perfluoroalkoxy (PFA) tubing, and
wherein the downstream tubing section comprises polypropylene tubing or tubing having a thermoplastic-elastomer outer layer with a plasticizer-free inner layer.

2. The molding apparatus of claim 1, wherein the downstream tubing section comprises a second tubing section, a third tubing section, and a fourth tubing section.

3. The molding apparatus of claim 2, wherein the second tubing section comprises 304 stainless steel piping.

4. The molding apparatus of claim 2, wherein the third tubing section comprises polypropylene tubing, polytetrafluoroethylene (PTFE) tubing, or tubing having a thermoplastic-elastomer outer layer with a plasticizer-free inner layer.

5. The molding apparatus of claim 2, wherein the fourth tubing section comprises polypropylene tubing, chlorinated polyvinyl chloride (CPVC) tubing, 304 stainless steel piping, 316 stainless steel piping, or any combination thereof.

6. The molding apparatus of claim 2, wherein the diaphragm valve is connected to the mold assembly by a fifth tubing section.

7. The molding apparatus of claim 6, wherein the fifth tubing section comprises 304 stainless steel piping.

8. The molding apparatus of claim 1, further comprising a static mixer disposed between the diaphragm valve and the mold assembly.

9. The molding apparatus of claim 8, further comprising a sixth tubing section connecting the static mixer to the mold assembly.

10. The molding apparatus of claim 1, wherein the mold assembly comprises a pair of separable mold halves.

\* \* \* \* \*